United States Patent [19]
Weisburn et al.

[11] Patent Number: 5,934,114
[45] Date of Patent: Aug. 10, 1999

[54] MECHANICAL LOCKING MECHANISM FOR A SECURITY PACKAGE

[75] Inventors: James T. Weisburn, Massillon, Ohio; Matthew P. Williams, Jamestown, N.C.; Dennis D. Belden, Jr.; James A. McGill, both of Canton, Ohio

[73] Assignee: Alpha Enterprises, Inc., N. Canton, Ohio

[21] Appl. No.: 09/024,777

[22] Filed: Feb. 17, 1998

Related U.S. Application Data

[60] Provisional application No. 60/038,634, Feb. 19, 1997.

[51] Int. Cl.⁶ ........................................ E05B 65/00
[52] U.S. Cl. .................. 70/57.1; 70/63; 206/1.5; 206/308.2; 206/387.11
[58] Field of Search ................ 70/57.1, 58, 63; 206/1.5, 308.2, 387.11; 292/86, 87, DIG. 38

[56] References Cited

U.S. PATENT DOCUMENTS

| | | | |
|---|---|---|---|
| D. 333,563 | 3/1993 | Weisburn et al. | D3/35 |
| 3,933,240 | 1/1976 | Humble | 206/1.5 |
| 4,589,549 | 5/1986 | Hehn | 206/387 |
| 4,629,067 | 12/1986 | Pavlik et al. | 206/425 |
| 4,819,797 | 4/1989 | Holmgren | 206/309 |
| 4,834,238 | 5/1989 | Hehn et al. | 206/387 |
| 5,039,982 | 8/1991 | Brühwiler | 340/572 |
| 5,205,401 | 4/1993 | Weisburn et al. | 206/1.5 |
| 5,211,283 | 5/1993 | Weisburn et al. | 206/1.5 |
| 5,215,188 | 6/1993 | Wittman | 206/1.5 |
| 5,289,914 | 3/1994 | Holmgren | 206/1.5 |
| 5,297,672 | 3/1994 | MacTavish | 206/1.5 |
| 5,375,712 | 12/1994 | Weisburn | 206/387 |
| 5,390,515 | 2/1995 | Essick | 70/63 |
| 5,460,266 | 10/1995 | Mundorf et al. | 206/309 |
| 5,524,752 | 6/1996 | Mazzucchelli | 206/308.2 |
| 5,588,315 | 12/1996 | Holmgren | 70/57.1 |
| 5,636,535 | 6/1997 | Shimada | 70/57.1 |
| 5,680,782 | 10/1997 | Komatsu et al. | 70/57.1 |
| 5,782,350 | 7/1998 | Weisburn et al. | 206/1.5 X |
| 5,823,341 | 10/1998 | Nakasuji | 206/387.11 |

*Primary Examiner*—Lloyd A. Gall
*Attorney, Agent, or Firm*—Sand & Sebolt

[57] ABSTRACT

A reusable plastic package for securely holding and displaying a rectangular article such as a compact disc. This reusable plastic package includes a housing having a rectangular-shaped storage compartment for selectively storing an article in the compartment. The storage compartment has an access opening for inserting and removing the article into and out of the compartment. An adjacent smaller compartment functions as a lock compartment whereby a slide plate is slidably mounted thereon and selectively movable across a portion of the access opening of the storage compartment for releasably securing the article in the storage compartment. Deflectable locking levers are formed within the lock compartment and engage with mating projections formed on the slide plate when the slide plate is in the locked position for securing the article within the package due to a portion of the slide plate blocking the access opening. A key which is insertable through openings formed in the end wall of the lock compartment disengages the locking levers from the projections to enable the slide plate to be moved to the unlocked position. The locking levers and projections are spaced apart in groups in the locking compartment and on the slide plate to provide space for an electronic article surveillance tag. Cutouts are formed in a back wall of the storage compartment and mate with complementary shaped retaining flanges and locking tabs of an adjacent package to permit nesting of the adjacent packages.

23 Claims, 6 Drawing Sheets

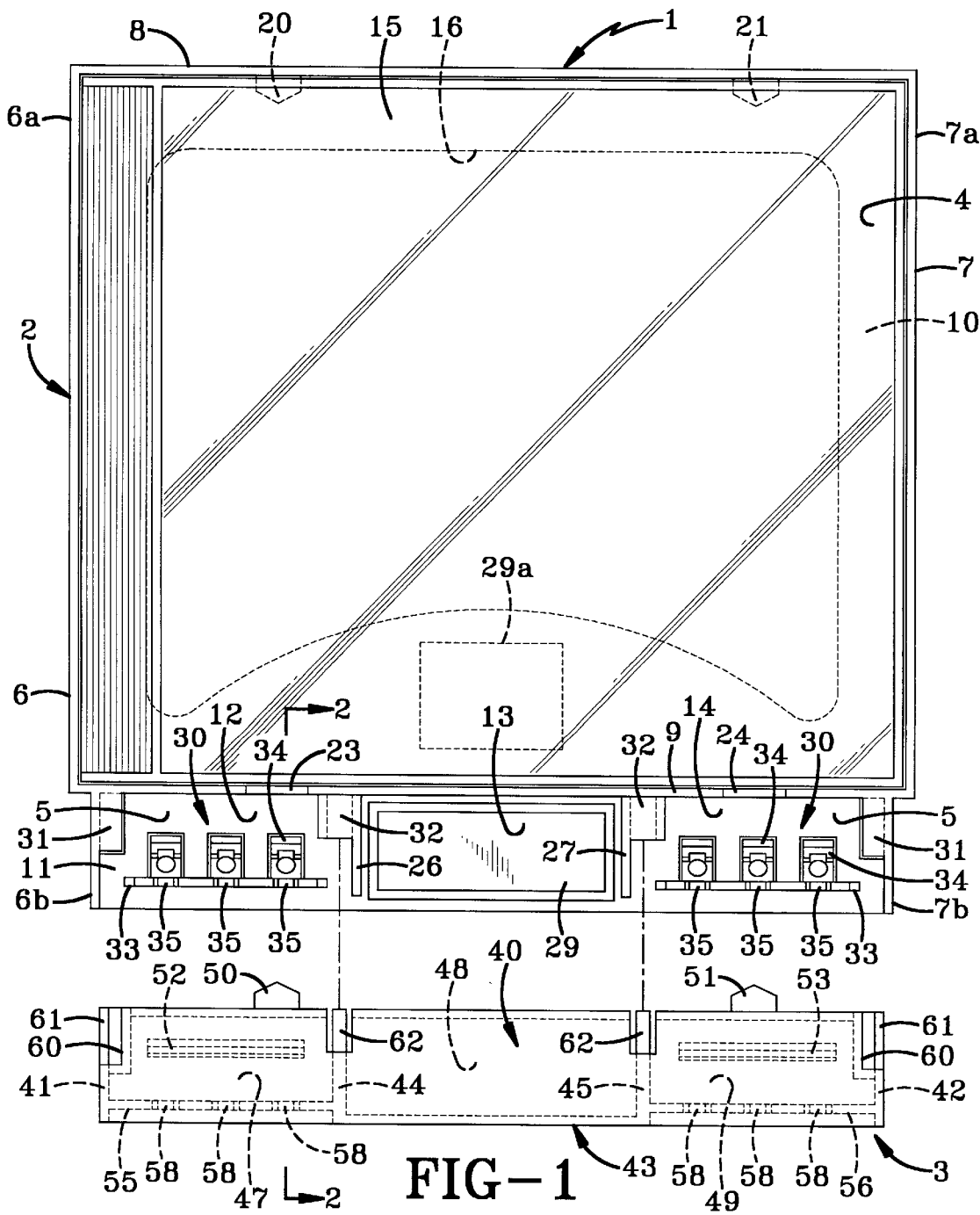
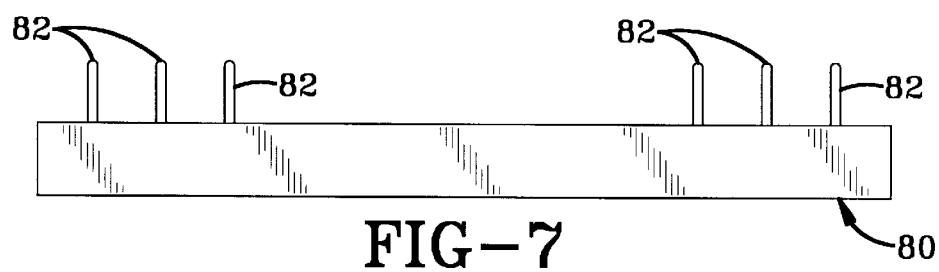

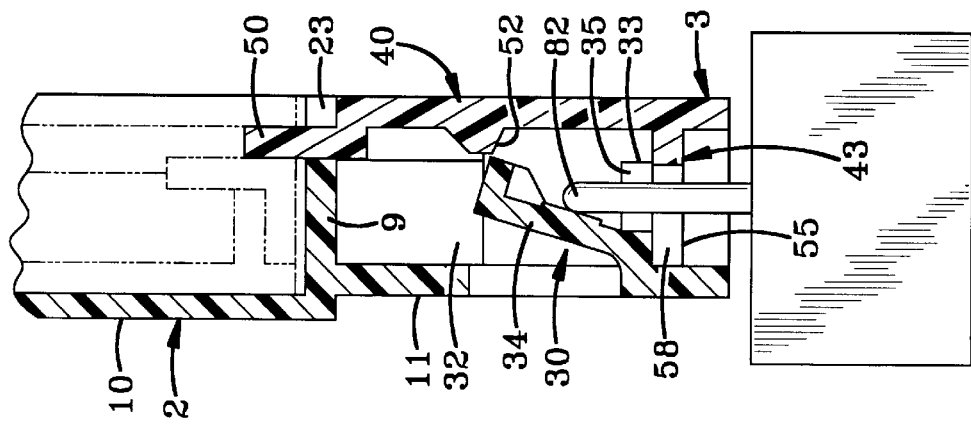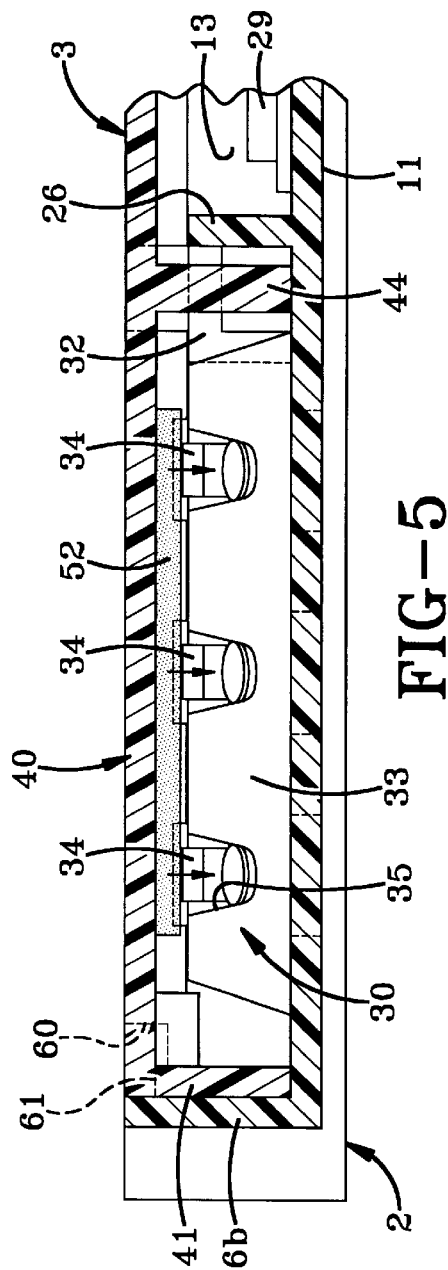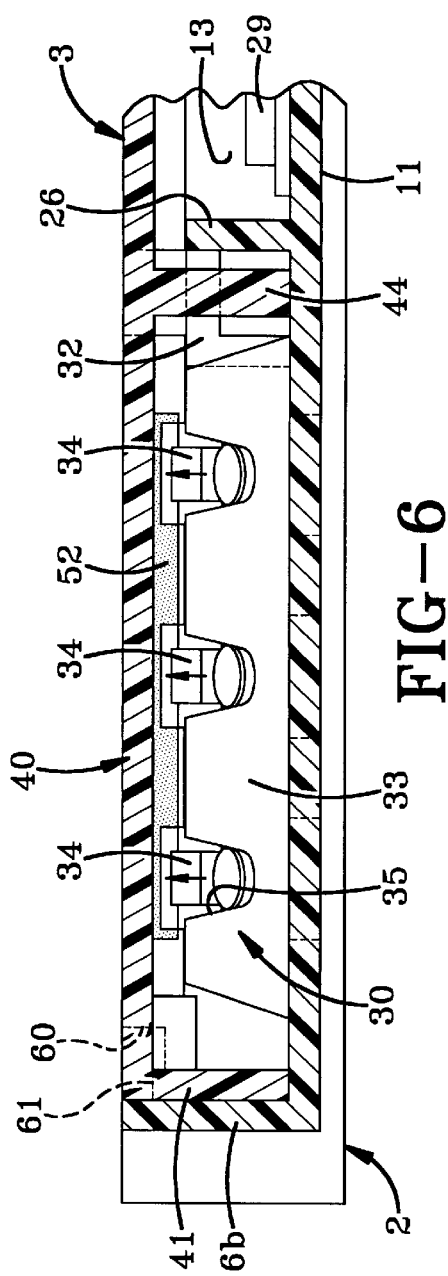

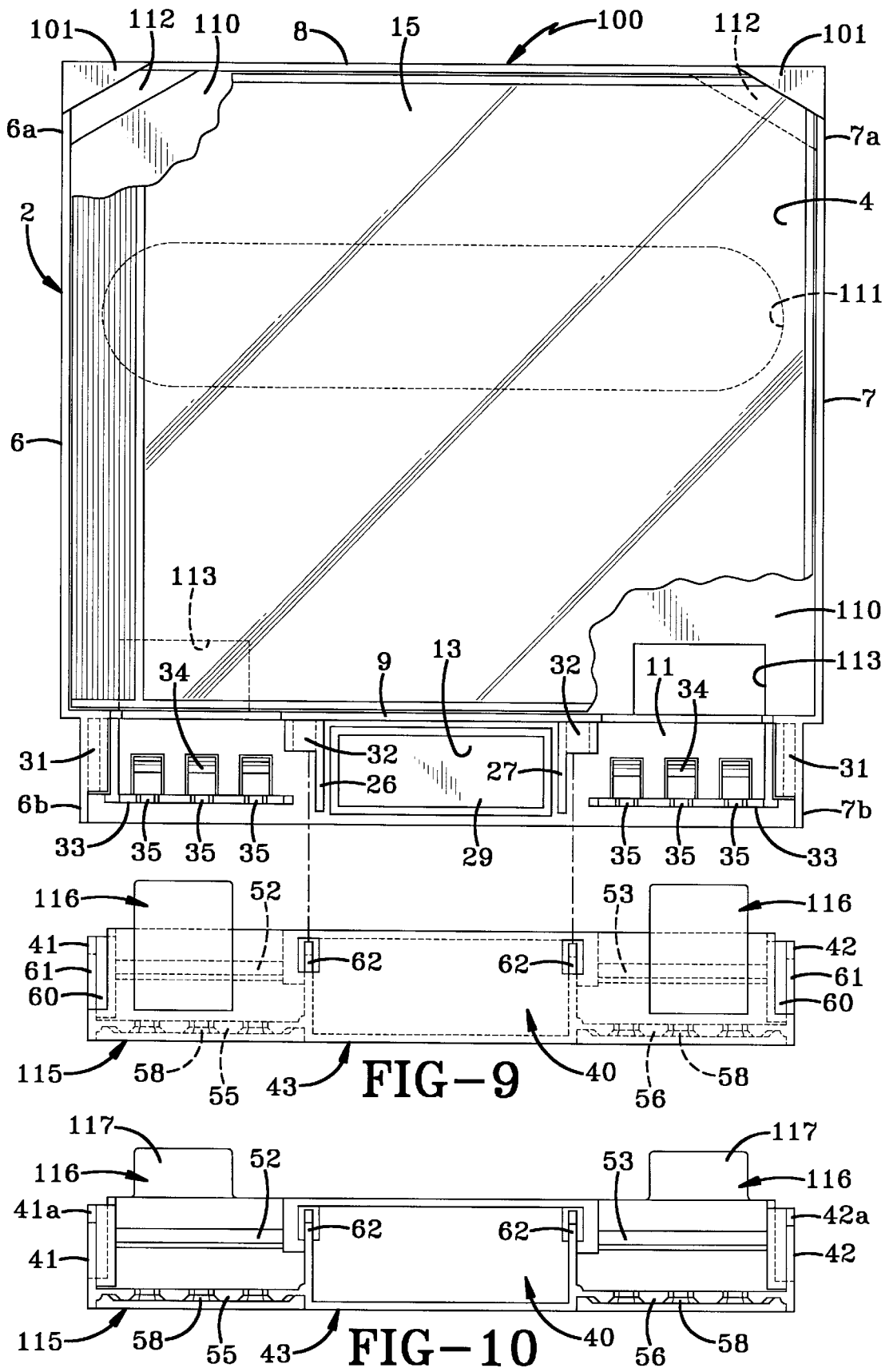

MECHANICAL LOCKING MECHANISM FOR A SECURITY PACKAGE

CROSS REFERENCE TO RELATED APPLICATIONS

This application claims the benefit of U.S. Provisional Application Ser. No. 60/038,634, filed Feb. 19, 1997.

BACKGROUND OF THE INVENTION

1. Technical Field

The invention relates to packages and in particular to a package for securely holding and displaying a rectangular-shaped article such as a storage box for recorded media. More particularly, the invention relates to a reusable security package for holding and displaying articles, preferably for recorded media and its storage container such as compact discs within jewel boxes, having a slide lock which when in a locked position prevents unauthorized removal of the article from within the security package; and in which the package is extremely thin which permits a greater number of packages to be stored in usual display files than possible with the thicker prior art packages. The invention also relates to a reusable security package that nests with other substantially identical packages so that a higher density of packages may be displayed in a display rack.

2. Background Information

In recent years, recorded media such as audio cassettes, compact discs, digital audio tapes, and mini discs (MD) have become increasingly popular, almost entirely replacing record discs and 8-track audio tapes. Specifically, compact discs (CDS) and laser discs are growing most rapidly in popularity with rapidly increasing sales of compact disc and laser disc players. These compact and laser discs are thin flexible plastic resin sheets with a digitally recorded engraved pattern and resemble small vinyl photograph records and are operated by a laser enclosed in a compact disc player. Compact discs are relatively small, very thin, and are usually far more expensive than the heretofore used audio tapes and 8-track tapes, and thus are more susceptible to theft when displayed for sale in a retail store outlet.

The introduction of these recorded media into the marketplace presents a problem to the retailer sellers in that these recorded media are considerably smaller than the heretofore used record discs and 8-track tapes, but still have to be displayed so that prospective purchasers can inspect the same to determine the artist, songs, etc. on the recorded media. This presents a security problem due to the extremely small size of the recorded media.

Therefore, it has become important that the recorded media, which are usually contained within their own storage container or box, such as a jewel box for compact discs, be repackaged in an outer security package to prevent their theft from the display cases used in most retail businesses. Since the compact discs generally are retained within a plastic box commonly referred to as a "jewel box" to protect the disc from scratching and damage and to provide a protective storage container for the disc when not in use, it is desirable that these plastic storage boxes be retained in the larger package for display to prevent theft of the smaller plastic storage box containing the CD. Various types of housings and security packages have been developed to provide a safe and secure device for displaying the CDS within jewel boxes while retarding unauthorized removal of the CD from the display package and subsequent theft from the store. These various types of display and security containers include U.S. Pat. Nos. 3,871,516, 4,285,429, 4,381,836, 4,589,549, 4,759,442, 4,760,914, 4,805,769, 4,834,238, 4,881,645, 4,951,814, 5,205,401, 5,211,283, and 5,460,266.

Although these prior art security packages for the various types of cassettes and recorded media have proven satisfactory for many applications, they present various problems, that is, the prior art security devices are bulky, complicated, difficult and time consuming to use or lock/unlock, too thick in relation to the cases that house the cassettes or CDS, not secure enough when locked, expensive and/or time consuming to manufacture.

Therefore, the need exists for an improved security package for various types of recorded media such as CDS in which the recorded media are maintained in their usual display boxes for standard display yet protected from theft, and in which the package is extremely thin enabling a greater number to be stored in existing display files.

SUMMARY OF THE INVENTION

Objectives of the invention include providing an improved security package which can be mass produced relatively inexpensively as a two-piece molded plastic member, one piece of which forms the main housing and the other piece being a lock or slide plate slidably mounted on the housing for securing a rectangular-shaped article in a storage compartment where the improved security package is slim in depth, preferably comparable to the depth of a jewel case, inexpensive and easy to both make and use, and designed for repeated reuse, and which can be manually loaded by retail shop personnel for subsequent sale, and which can be unloaded easily at the point of sale.

Another objective of the invention is to provide such a security package in which printed information on the stored article, and specifically on the large front or back face of the jewel case, is visible through enlarged openings formed in the walls of the housing which form the storage compartments.

Another objective of the invention is to provide such a security package in which the article to be stored is slid easily into the storage compartment and secured therein by the easily operated manual slide plate which is selectively moved over the access opening of the storage compartment to prevent unauthorized removal of the article from within the storage compartment.

A further objective of the invention is to provide such a security package in which an inexpensive key formed of molded plastic is insertable into openings formed in the housing and/or slide plate, whereby the slide plate can be moved to an unlocked position permitting the stored article to be manually removed from the storage compartment upon completion of a sale, enabling the package to be reused for storing another article for sale.

A still further objective is to provide such a package which can be molded of rugged plastic material and repeatedly reused, thereby reducing the cost to a manufacturer and/or distributor of the articles to be stored therein, such as audio cassettes, compact discs, etc.

Still another objective of the invention is to provide such a security package in which an end of the slide plate opposite of a locking edge is aligned with an end wall of a housing having a lock compartment therein when the slide plate is in a locked position, preventing the formation of a lip which could be grasped to enable the slide lock to be pried from the housing to steal a stored article from the package.

A further objective of the invention is to provide such a security package in which locking levers and projections are located within the lock compartment and slide plate, and are spaced apart in groups, thereby enabling another portion of the compartment to be void for the placement and storage of an electronic article surveillance tag therein, preferably in an inconspicuous manner, but in any case, to detect unauthorized removal of the security package with an article therein from the retail business.

Another objective is to provide such a security package in which the orienting tabs and grooves on the slide plate that secure the article when locked, are formed as part of the locking mechanism and prevent the locking mechanism from moving to the locked position unless the orienting tabs and grooves are received within openings and stops formed in the storage compartment to ensure that the article to be stored is properly oriented within the storage compartment of the security package.

Another objective of the invention includes providing an improved security package which package enables the compact disc to remain in its usual display and storage package such as its jewel box in the case of a CD, which in turn is secured within the security package that retards theft of the compact disc.

A further objective of the invention is to provide such an improved security package which has an end portion thereof with a thickness generally equal to the thickness of the display package such as a jewel case containing the compact disc, which display package is secured within the security package, thereby enabling a greater number of the security packages to be mounted and displayed in display cases and racks heretofore only useable for the unsecured package, that is the jewel case, by positioning the security package in the display rack by the end of the package which has the same general shape and thickness of the jewel case contained therein.

Another objective of the invention is to provide such an improved security container which can be easily injection molded of various types of plastics in two components, namely, a housing and a slide plate, wherein the slide plate then is easily snap-fitted into position on the housing, thus providing for the economic manufacture and assemble of the security container.

A further objective is to provide such a security package in which one entire side is continuous and lies in a common plane to assist in increasing the number of packages that can be stored in existing prior art display racks.

A still further objective is to provide such a security package in which the locking tabs are released from their locked position by a key having a plurality of tangs or fingers which extend through openings formed in the end wall of the lock compartment.

A further objective of the present invention includes providing a nestable security package for recorded media having a substantially smaller storage footprint than those security packages known in the art.

Still another objective of the present invention includes providing a nestable security package for recorded media having a configuration that allows the front and rear surface of the item of recorded media to be viewed when the item of recorded media is lockingly received in the security package.

Yet another objective of the present invention includes providing a nestable security package for recorded media wherein a locking mechanism known in the art may be employed without significant modification.

A further objective of the present invention includes providing a nestable security package for recorded media having a configuration that allows the front surface of the security package to nest with the rear surface of a next adjacent security package to decrease the shelf space occupied by the security package.

Another objective of the present invention includes providing a nestable security package for recorded media having a configuration that permits the security packages to tilt with respect to each other while in a nested condition.

A further objective of the present invention includes providing a nestable security package for recorded media having a configuration that enables the package to be easily removed from two other nested packages.

Another objective of the invention is to provide such a security package which is of an extremely simple construction, which achieves the stated objectives in a simple, effective, and inexpensive manner, and which solves problems and satisfies needs in the art.

These and other objectives and advantages are obtained by the improved security package of the invention, the general nature of which may be stated as including a security package for holding and displaying a rectangular-shaped article including a housing having a rectangularly shaped storage compartment formed by spaced sidewalls, end walls and a back wall for selectively storing the article, said compartment having an access opening opposite the back wall for inserting and removing the article into and out of said compartment; a lock compartment formed adjacent the storage compartment; a slide plate movably mountable on the lock compartment and selectively movable across at least a portion of the access opening of the storage compartment between locked and unlocked positions, for releasably securing said article in said storage compartment; at least one deflectable tab formed on one of said lock compartment and slide plate and a block formed on the other of said lock compartment and slide plate and engageable with the deflectable tab for releasably securing the slide plate in the locked position; and unlocking access opening means formed in a end of the lock compartment for receiving an unlocking key for releasing the tab from the block to enable the slide plate to move to the unlocked position.

BRIEF DESCRIPTION OF THE DRAWINGS

Preferred embodiments of the invention, illustrative of the best mode in which applicants have contemplated applying the principles, are set forth in the following description and are shown in the drawings and are particularly and distinctly pointed out and set forth in the appended claims.

FIG. 1 is a top plan view of the security package with the locking slide plate removed therefrom;

FIG. 5 is a greatly enlarged fragmentary transverse sectional view taken on line 5—5 of FIG. 2 when the slide plate is partially inserted into the housing as shown in FIG. 3, with the locking bar being shaded for clarity;

FIG. 6 is a view similar to FIG. 5 when the slide plate is fully inserted and locked into the housing as shown in FIG. 4, with the locking bar being shaded for clarity;

FIG. 7 is an elevational view showing one type of key for use with the security package of the present invention;

FIG. 8 is a fragmentary sectional view of the security package similar to FIG. 4, showing the unlocking key of FIG. 7 moving the locking levers to an unlocked position;

FIG. 9 is a top plan view similar to FIG. 1 of a modified security package with the slide plate being removed therefrom;

FIG. 10 is a bottom plan view of the slide plate of FIG. 9;

Similar numerals refer to similar parts throughout the drawings.

DESCRIPTION OF THE PREFERRED EMBODIMENT

Figure 2:
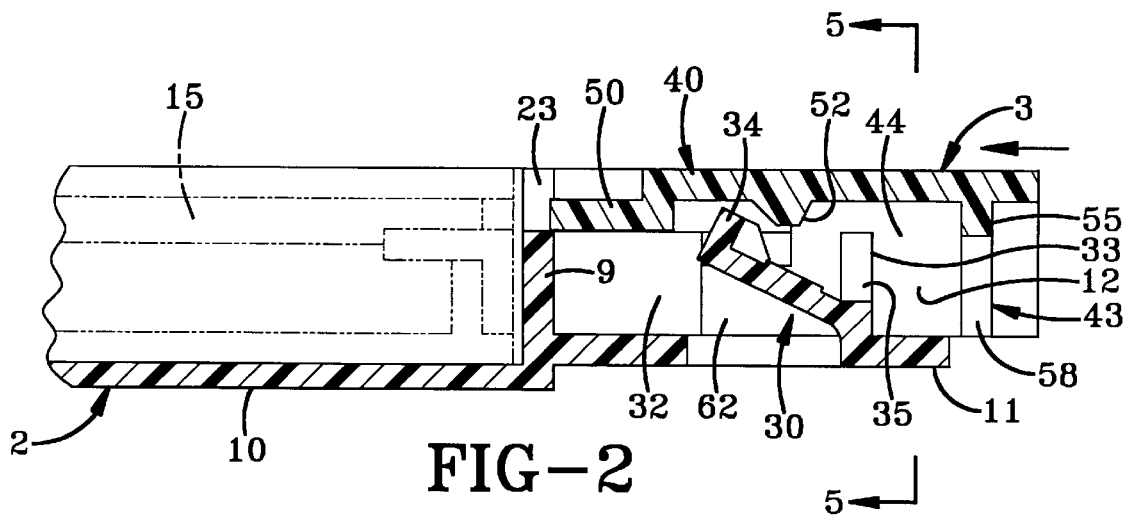
FIG. 2 is an enlarged fragmentary longitudinal section view taken on line 2—2 in FIG. 1 with the slide plate mounted on the housing and in an unlocked position.

The improved security package of the present invention is indicated generally at 1, and is shown particularly in FIG. 1. The security package 1 includes a main housing 2 and a slide plate 3, where both housing 2 and slide plate 3 are each preferably formed as an integral one-piece plastic member, most preferably of a high-impact polystyrene.

Security package 1 has a general rectangular configuration with a generally thin depth substantially equivalent to that of a compact disc jewel case. The generally rectangular configuration of security package 1 is defined by a large storage compartment 4 and a small lock compartment 5. Overall, housing 2 includes a pair of longitudinally extending parallel side walls 6 and 7 of a stepped construction which extend throughout the longitudinal length of housing 2, a pair of parallel end walls 8 and 9 which extend between and are perpendicular to side walls 6 and 7, and a pair of back walls 10 and 11 (as more clearly shown in FIGS. 2–4).

Storage compartment 4 is formed by storage side wall 6a and 7a, end walls 8 and 9, and back wall 10. This resulting compartment 4 has four sides or ends and a back face thereby providing a space in which a rectangular-shaped article 15 such as a compact disc, may be placed for storage through an open side or access opening opposite wall 10. Wall 10 may further include one or more openings 16 preferably of smaller length and width than wall 10 and spaced inwardly apart from each of walls 6a, 7a, 8 and 9 whereby opening 16 is provided so as to supply access to a back side of article 15 for more efficient removal of article 15 when slide plate 3 is not in the locked position as described below.

Storage compartment 4 further includes a pair of spaced apart tabs 20 and 21 extending inward from end wall 8 into storage compartment 4. Tabs 20 and 21 are preferably spaced apart from back wall 10 a distance substantially equivalent to the depth distance of article 15, that is a depth distance of a standard compact disc jewel case when article is such. Tabs 20 and 21 may be of any geometrical configuration so long as each extends inward into storage compartment 4 so as to act as a lip for holding article 15 therein when article 15 is fully inserted within storage compartment 4, by either preferably inserting within corresponding slots in said article, or alternatively wrapping over said article. In the preferred embodiment, tabs 20 and 21 are either of a trapezoidal construction whereby one outermost point extends further into storage compartment 4 and another outermost point, or as is shown in FIG. 1 of a semi-hexagonal shape where the hexagon is divided across the midpoint of two sides such that each tab has three outermost points extending inward into storage compartment whereby the center outermost point extends further therein. Storage compartment 4 also includes a pair of spaced apart notches 23 and 24 in end wall 9 where each notch extends inward from an outermost edge of end wall 9 opposite back wall 10.

Lock compartment 5 is formed by lock side walls 6b and 7b, end wall 9, and back wall 11. Lock compartment 5 is divided into three subcompartments 12, 13 and 14 by divider walls 26 and 27. Subcompartment 13 includes an electronic artificial surveillance (EAS) tag 29 (although the tag could be located at 29A), while subcompartments 12 and 14 include a locking mechanism 30. Subcompartments 12 and 14 each also include pry stops embodied in FIG. 1 as a planar stop 31 that is parallel to back wall 11 and spaced apart therefrom. Stop 31 is integrally molded into side wall 6b and 7b, respectively, and end wall 9, and a L-shaped stop 32 that is L-shaped with a parallel portion to back wall 11 that extends out from end wall 9 and divider wall 26 and 27, respectively, and is connected to a perpendicular portion to back wall 11 that extends from the parallel portion to back wall 11 and outward from end wall 9.

Each locking mechanism 30 has an access restriction wall 33 extending perpendicularly upward from back wall 11. Each locking mechanism 30 also includes one or more locking levers 34 that obliquely extend into lock compartment 5 from the intersection of wall 33 with wall 11. In the embodiment shown in FIG. 1, each locking mechanism 30 includes three locking levers 34. Access restriction wall 33 includes one cutout 35 corresponding to each locking lever 34 where the cutout 35 is longitudinally aligned with the lever. Cutouts 35 preferably will have a generally U-shaped notch configuration. The slope of each lever 34 may be constant, or may increase as the lever extends away from walls 33 and 31 as is shown in FIG. 1 thereby defining an outermost lip that is approaching perpendicular to back wall 11. This change in slope may be gradual or at distinct points as is shown in FIG. 1.

Slide plate 3 as is shown in FIG. 1 has a front wall 40 terminating at opposing sides in side walls 41 and 42 and an end wall 43 extending therebetween and along and downwardly from an end edge of wall 40. A pair of divider walls 44 and 45 extend from end wall 43 along front wall 40 in a spaced apart and parallel manner between side walls 41 and 42 so as to divide slide plate 3 into three subcompartments 47, 48, and 49 of similar dimension to the subcompartments 12–14 of compartment 5.

Slide plate 3 includes a pair of tabs 50 and 51 extending substantially planarly from and outwardly of front wall 40, and in an aligned manner with notches 23 and 24, respectively, when slide plate 3 is aligned with lock compartment 5 as is shown in FIG. 1. On an inner surface of slide plate 3 is a pair of blocking or locking bars 52 and 53 which extend downwardly from front wall 40 in each of subcompartments 47 and 49, respectively. Slide plate end wall 43 is divided into a pair of access restriction walls 55 and 56 extending between side wall 41 and divider wall 44, and side wall 42 and divider wall 45, respectively. Each access restriction wall includes a number of inverted U-shaped notches or cutouts 58 correlating in number to the number of cutouts 35 in walls 33 of housing 2. The cutouts 58 and 35 correspond to form a plurality of relatively circular shaped unlocking access openings when walls 55 and 56 are aligned with walls 33.

Slide plate 3 further has molded in grooves 60 formed in the edges of top wall 40 adjacent each of the side walls 41 and 42 which are correspondingly alignable with planar stops 31 so as to force slide plate 3 under stops 31 and prevent slide plate 3 from being removed from lock compartment 5 by a lifting action such as prying that would increase the distance between back wall 11 and front wall 40. Within grooves or cutouts 60 are slightly raised surfaces 61 that frictionally fit within planar stops 31. Slide plate 3 further includes a locking tab 62 extending outward from the end of each divider wall 44 and 45. Each locking tab 62 is spaced apart from front wall 40 so as to define a slot therebetween. Similar to the function of grooves 60, locking tab 62 engages L-shaped stop 32 thereby prohibiting separation of slide plate 3 by lifting or prying when the distance between back wall 11 and front wall 40 is increased.

In accordance with one of the features of the invention, one surface of package 1 defined by the top edges of end wall 8, storage side walls 6a and 7a, end wall 9, and the top surface of front wall 40 of slide plate 3, lie in a common plane which provides a continuous smooth surface, which in combination with the reduced thickness of lock compartment 5, enables a greater number of packages 1 to be stored in usual types of storage and display racks used in many retail stores. The reduced thickness of lock compartment 5 is achieved by cutouts 58 being formed in end wall 43 which align with cutouts 35 to provide the unlocking access openings for receiving a key therein, instead of in front wall 40 as in prior art security containers.

In operation, security package 1 provides a reusable security device for preventing unauthorized removal of an article such as a compact disc in a jewel case from a store. Specifically, an article 15 such as a compact disc within a jewel case is inserted into storage compartment 4 by sliding one end of article 15 against end wall 8 so that apertures formed in selected sidewalls of the jewel box receive tabs 20 and 21 therein, or alternatively slides under tabs 20 and 21. Once article 15 is substantially adjacent end wall 8, article 15 drops completely within storage compartment 4 which is substantially identically sized. At this time, article 15 may be locked within security package 1.

Figure 3:
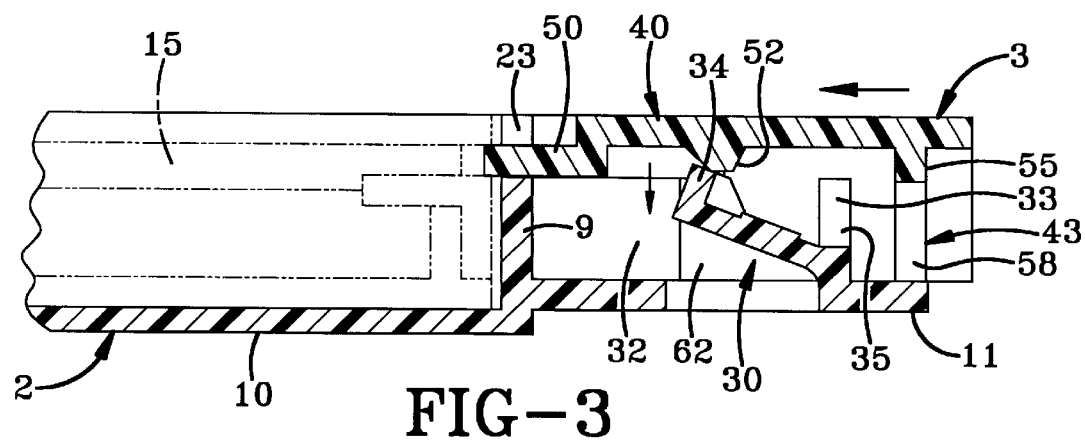
FIG. 3 is an enlarged sectional view similar to FIG. 2 with the slide plate partially inserted into the housing but not locked.
Figure 4:
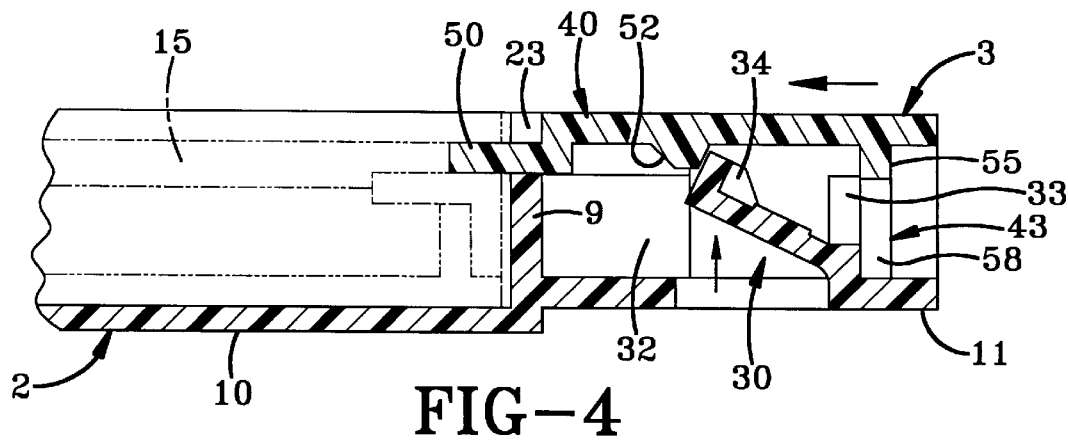
FIG. 4 is an enlarged sectional view similar to FIGS. 2 and 3 with the slide plate fully inserted and locked into the housing.

This locking procedure occurs by aligning slide plate 3 with lock compartment 5. Specifically, slide plate 3 is longitudinally aligned below lock compartment 5 as is shown in FIGS. 1 and 2 in section. Slide plate 3 is moved longitudinally inward where grooves 60 are aligned with planar stops 31, and locking tabs 62 are aligned with L-shaped stops 32. Further insertion causes groove 60 to slide partially under stop 31 and tab 62 to slip slightly into stop 32 whereby such insertion meets a slight resistance as each locking bar 52 interacts with and engages the slope surface of locking levers 34 as is shown in FIG. 3. Continued insertion results in slight downward bending of locking levers 34 away from locking bar 52 as is shown by the arrows in FIG. 3. Eventually, locking bar 52 rides over locking levers 34 thereby allowing locking levers 34 to rebound or snap back to their original position and rest behind locking bar 52 as is shown in FIG. 4 but block the movement of slide plate 3 in the unlock direction. Once this has occurred, slide plate 3 is no longer removable from lock compartment 5 and housing 2. The result is the insertion of tabs 50 and 51 through notches 23 and 24 and into storage compartment 4 thereby blocking removal of article 15 from within storage compartment 4 by engaging the jewel box aperture as shown in FIGS. 4 and 8, similar to engagement by tabs 20–21 in other apertures at the other end of the article. At this time, grooves 60 are fully inserted under stops 31, and locking tabs 62 on divider walls 45 are inserted under L-shaped stops 32 such that slide plate 3 is not removable by increasing the distance between slide plate 3 and back wall 11. Walls 7a, 7b and 11 on the housing 2 and walls 40, 41 and 42 on the slide plate form a tight box deplete of lips or other areas for prying package 1 apart.

This locking where the locking bars 52 and 53 ride over locking levers 34 is clearly shown in FIGS. 5 and 6. In FIG. 5 the locking bar is bending each of the locking levers 34 downward. In contrast, in FIG. 6 the locking bar has already passed the locking levers 34 and thereby allowed their return to their standard position which blocks removal of slide plate 3.

When it is desirable to remove article 15 from security package 1 such as at point-of-sale, a key 80 is necessary as is shown in FIG. 7. Keys are well known in the art and key 80 is shown merely for illustration purposes only. Key 80 includes a plurality of outwardly extending fingers 82. Each of these fingers 82 is correspondingly positioned on key 80 so as to align with the hole defined by the alignment of cutouts 35 and 58 when walls 33 and 55 are adjacent one another. In operation, fingers 82 slide through this hole as defined by cutouts 35 and 58 as is shown in FIG. 8. When the fingers are fully inserted, each finger rides on the sloped surface of locking levers 34 so as to bend locking levers 34 away from the mating projection as embodied in locking bar 52 thereby allowing housing 2 to be removed from slide plate 3. Once housing 2 is removed from slide plate 3, tabs 50 and 51 no longer block article 15 from being removed from storage compartment 4 via the access opening. Security package 1 is then reusable on another article as desired.

The location of the access cutouts 35 and 58 in the rear end wall 43 of the lock housing instead of in a top or bottom surface as in prior art security packages greatly assist in providing the reduced thickness and facilitates the unlocking of the package at a checkout counter of a retail store.

A modified embodiment of security package 1 is shown in FIGS. 9–14 and is indicated generally at 100. Package 100 is similar in many respects to package 1 described above except that tabs 20 and 21 are removed from end wall 8 and replaced with a pair of diagonally extending flanges 101 which extends across the corner between walls 6 and 7 spaced on the opposite edges of walls 6 and 7 from back wall 110 which has a slightly different configuration from back wall 10 of package 1. Back wall 110 is formed with an oval shaped central cutout 111, and in accordance with one of the features of modified package 100, is formed with a pair of triangular shaped corner openings or cutouts 112 adjacent wall 6, 7 and 8, and a pair of rectangular shaped openings or cutouts 113 extending inwardly from end wall 9. The function of cutouts 112 and 113 is described further below.

Figure 11:
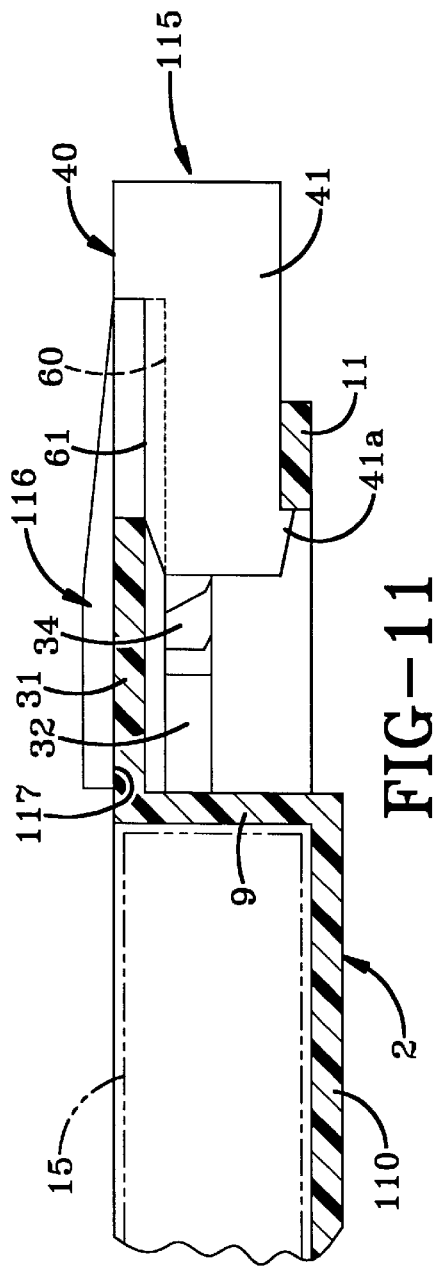
FIG. 11 is an enlarged fragmentary sectional view of the left-hand corner of FIG. 9 with the slide plate mounted on the housing and in the open position.

Slide plate 115 is similar in most respects to slide plate 3 discussed above with the main exception being that tabs 50 and 51 are replaced with a pair of rectangular shaped lock tabs 116. These tabs are shown particularly in FIGS. 9 and 11 and are formed integrally with top wall 40 of plate 115 and extend outwardly therefrom toward storage compartment 4. Locking tabs 116 as shown in FIG. 11, are raised above the top surface of slide plate wall 40 so that bottom surfaces 117 thereof are at the same plane with the front edges of walls 6 and 7 so as to slide over jewel box 15 to secure the jewel box or other article in compartment 4. Thus, jewel box 15 is securely retained within storage compartment 4 by two of its corners being retained under flanges 101 and the end opposite portion of the jewel box being retained under locking tabs 116. Thus, the jewel box is loaded easily within security package 100 by sliding a front edge beneath flanges 101 with the rear edge dropping into storage compartment 4 when tabs 116 are in the unlocked position as shown in FIG. 11. Slide plate 115 then is slid forwardly in the same manner as discussed above with respect to slide plate 3, with stops or locking bars 52 and 53 sliding over locking levers 34 allowing levers 34 to rebound or snap back to the original position and rests behind locking bars 52 and 53 as shown in FIG. 13.

End walls 41 and 42 of slide plate 115 terminate in raised end projections 41a and 42a respectively, which engage back wall 11 of the lock compartment when slide plate 115 is in the unlocked position as shown in FIG. 11 to limit the rearward movement of the slide plate.

Figure 12:
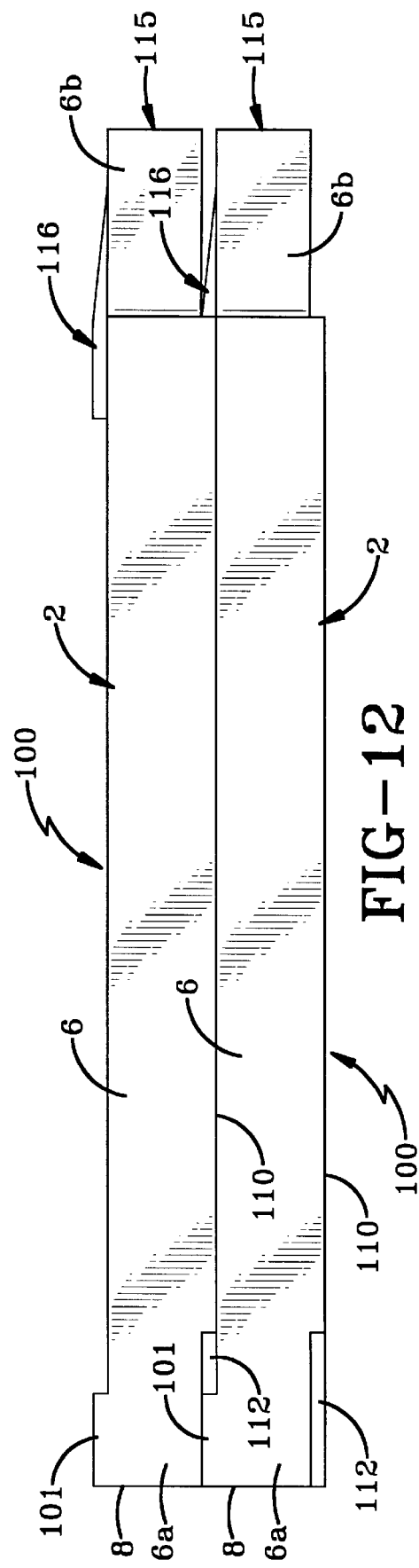
FIG. 12 is a side elevational view of a pair of the security packages of FIG. 9 in a nested stacked position.
Figure 13:
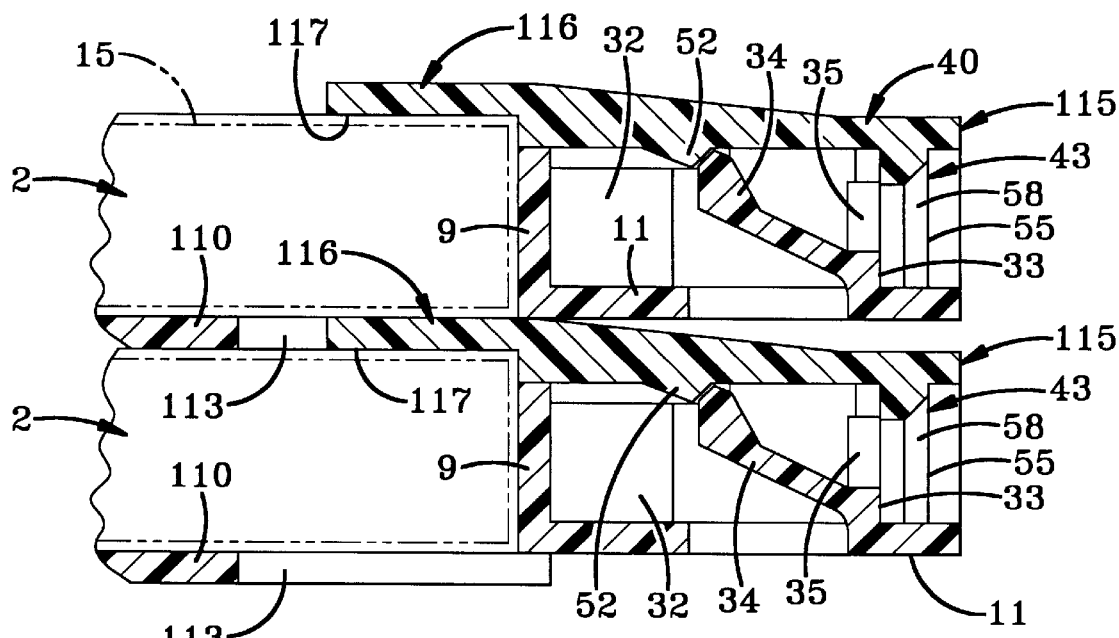
FIG. 13 is an enlarged fragmentary sectional view of the right-hand portion of FIG. 12.
Figure 14:
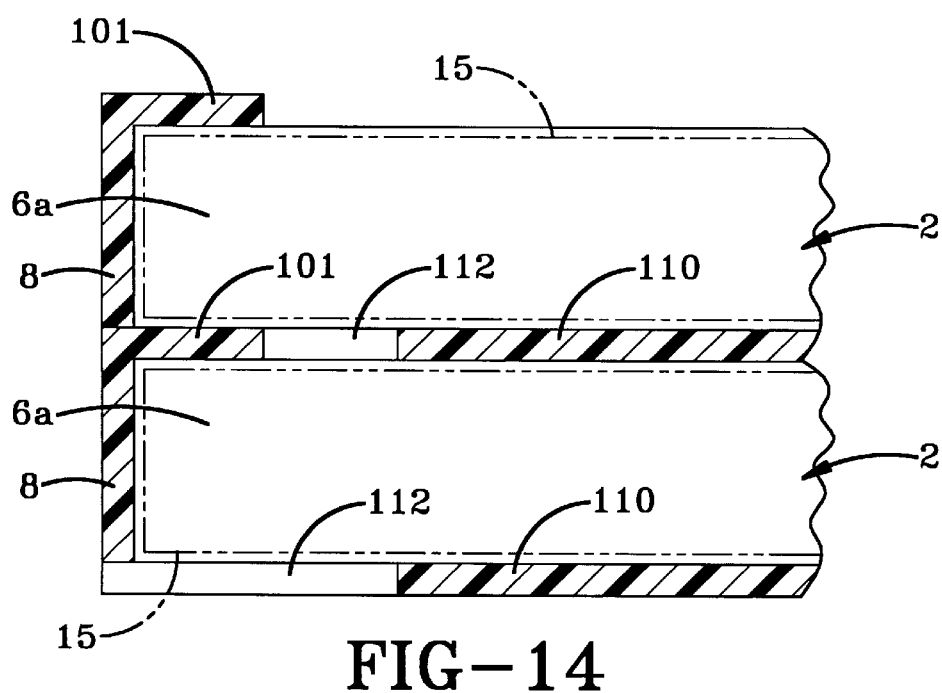
FIG. 14 is an enlarged fragmentary sectional view of the left-hand portion of FIG. 12.

One of the unique features achieved by modified security package 100 is its stackability wherein adjacent packages are nested together to reduce storage and shipping space as shown particularly in FIGS. 12–14. This nestability is achieved by corner cutouts 112 aligning with flanges 101 as shown in FIG. 14, when adjacent packages are placed together. Likewise, locking tabs 116 will extend into rectangular shaped cutouts 113 as shown in FIG. 13, to provide this nestability of the adjacent security packages. Thus, as shown in FIGS. 12, 13 and 14, the overall thickness is not materially increased due to the nesting of flanges 101 and tabs 116 in cutouts 112 and 113 respectively, of an adjacent security package.

Accordingly, security package 100 provides the same security features discussed above with respect to security package 1 while eliminating locking tabs 20, 21, 50, 51 which are useable only with certain types of jewel boxes. These retaining members are replaced with corner flanges 101 and locking tabs 116, which trap the jewel box or other type of article within storage compartment 4 thereby avoiding the requirement that only a jewel box can be retained therein having apertures formed in sidewalls for receiving locking tabs 20, 21, 50, 51 as in package 1. Furthermore, this versatility provided by package 100 is achieved without materially increasing the thickness thereof by providing the package with the same thin profile as that provided by package 1. However, one of the important features which enables this thinness to be achieved by both embodiments is the reduction in the thickness of the lock compartment 5 by fingers 82 of key 80 entering through the access openings formed in the end of the package in contrast to the prior art security packages where the key extends through the front or back walls of the lock compartment.

It is readily understood that deflectable tabs 34 could be formed on the slide plate and the locking bars 52 and 53 be formed in the lock compartment in packages 1 and 100 and function similarly to that described above wherein the deflectable tabs are formed in the lock compartment and the locking bars formed on the slide plate, without affecting the concept of the invention.

Accordingly, the improved security package is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved security package is constructed and used, the characteristics of the construction, and the advantageous, new and useful results obtained; the new and useful structures, devices, elements, arrangements, parts and combinations, are set forth in the appended claims.

We claim:

1. A security package for holding and displaying a rectangular-shaped article comprising:
   a housing having a rectangularly shaped storage compartment formed by spaced sidewalls, end walls and a back wall for selectively storing the article, said compartment having an access opening opposite the back wall for inserting and removing the article into and out of said compartment;
   a lock compartment fixed adjacent to the storage compartment;
   a slide plate movably mountable on the lock compartment and selectively movable across at least a portion of the access opening of the storage compartment between locked and unlocked positions, for releasably securing said article in said storage compartment;
   at least one deflectable tab formed on one of said lock compartment and slide plate and at least one block formed on the other of said lock compartment and slide plate and engageable with the deflectable tab for releasably securing the slide plate in the locked position; and
   unlocking access opening formed in an end of the lock compartment for receiving an unlocking key for releasing the tab from the block to enable the slide plate to move to the unlocked position.

2. The security package of claim 1 wherein said deflectable tab is a plurality of flexible tabs molded in spaced relationship within the lock compartment.

3. The security package of claim 2 wherein said deflectable tabs are obliquely affixed within said lock compartment.

4. The security package of claim 2 wherein the said at least one block for blocking the deflectable tab during selective movement of said slide plate in the lock compartment includes a pair of spaced bars formed on the slide plate.

5. The security package of claim 2 further comprising a wall extending outward from said lock compartment adjacent to the deflectable tabs whereby the wall includes openings formed therein aligned with said tabs.

6. The security package of claim 5 wherein said slide plate includes an end wall formed with openings therein alignable with said openings in the lock compartment wall so as to define the unlocking access opening into the lock compartment when the slide plate is in the locked position.

7. The security package of claim 6 wherein the openings formed in the slide plate end wall are inverted generally U-shaped notches.

8. The security package of claim 7 wherein the openings in the lock compartment wall are generally U-shaped notches and when aligned with the inverted U-shaped notches of the slide plate provides a generally circular shape to the unlocking access opening.

9. The security package of claim 1 including stop means formed on the lock compartment and slide plate for retaining the slide plate on the lock compartment when in the unlocked position.

10. The security package of claim 1 wherein the housing is formed as a one piece member of plastic material.

11. The security package of claim 1 including at least one flange formed on the housing and spaced from the lock compartment and extending over a portion of the article access opening for assisting in retaining the article in the storage compartment.

12. The security package of claim 11 in which the at least one flange includes a pair of flanges extending across spaced corners of the housing; and in which complementary shaped cutouts are formed in the back wall of the housing and are aligned with and spaced from the flanges for receiving the corresponding flanges of an adjacent security package to place said adjacent packages in a nested relationship.

13. The security package of claim 1 in which the slide plate includes at least one outwardly projecting tab extendable across the article access opening of the storage compartment when the slide plate is in the locked position to block removal of the article from said compartment.

14. The security package of claim 13 in which a cutout is formed in the back wall of the housing adjacent the lock compartment and aligned with the tab when said tab is in the locked position for receiving the tab of an adjacent security package to enable said adjacent packages to be placed in a nested relationship.

15. A combination jewel box for holding a compact disc and a security package for holding and displaying said jewel box, said package comprising:

a housing having a rectangularly shaped storage compartment complementary in size and configuration to said jewel box, said housing being formed by spaced sidewalls, end walls and a back wall, said compartment having an access opening opposite the back wall for inserting and removing the jewel box into and out of said compartment;

a lock compartment fixed adjacent to the storage compartment;

a slide plate movably mountable on the lock compartment and selectively movable across at least a portion of the access opening of the storage compartment between locked and unlocked positions, for releasably securing the jewel box in said storage compartment;

at least one deflectable tab formed on one of said lock compartment and slide plate and at least one block formed on the other of said lock compartment and slide plate and engageable with the deflectable tab for releasably securing the slide plate in the locked position; and unlocking access opening formed in an end of the lock compartment for receiving an unlocking key for releasing the tab from the block to enable the slide plate to move to the unlocked position.

16. The combination of claim 15 wherein said deflectable tab is a plurality of flexible tabs molded in spaced relationship within the lock compartment.

17. The combination of claim 16 wherein the said at least one block for blocking the deflectable tab during selective movement of said slide plate in the lock compartment includes a pair of spaced bars formed on the slide plate.

18. The combination of claim 16 further comprising a wall extending outward from said lock compartment adjacent to the deflectable tabs whereby the wall includes openings formed therein aligned with said tabs.

19. The combination of claim 18 wherein said slide plate includes an end wall formed with openings therein alignable with said openings in the lock compartment wall so as to define the unlocking access opening into the lock compartment when the slide plate is in the locked position.

20. The combination of claim 15 including at least one flange formed on the housing and spaced from the lock compartment and extending over a portion of the article access opening for assisting in retaining the article in the storage compartment; said at least one flange including a pair of flanges extending across spaced corners of the housing; and in which complementary shaped cutouts are formed in the back wall of the housing and are aligned with and spaced from the flanges for receiving the corresponding flanges of an adjacent security package to place said adjacent packages in a nested relationship.

21. The combination of claim 15 in which the slide plate includes at least one outwardly projecting tab extendable across the jewel box access opening of the storage compartment when the slide plate is in the locked position to block removal of the jewel box from said compartment.

22. The combination of claim 21 in which a cutout is formed in the back wall of the housing adjacent the lock compartment and aligned with the tab when said tab is in the locked position for receiving the tab of an adjacent security package to enable said adjacent packages to be placed in a nested relationship.

23. The combination of claim 15 in which the jewel box is formed with a plurality of apertures in selected walls thereof; and in which at least one tab is formed on the slide plate and extend into certain of said jewel box apertures when the slide plate is in the locked position to retain said jewel box in the storage compartment.

\* \* \* \* \*